United States Patent [19]
Seidelberger et al.

[11] Patent Number: 5,517,538
[45] Date of Patent: May 14, 1996

[54] SAFETY DEVICE PROTECTING A NUCLEAR REACTOR PRESSURE VESSEL AGAINST OVERPRESSURE FAILURE

[75] Inventors: Hartmut Seidelberger, Erlangen; Horst-Dieter Stockhausen, Nürnberg; Gerhard Hau, Albstadt; Josef Hollmann, Schlüsselfeld, all of Germany

[73] Assignee: Siemens Aktiengesellschaft, Munich, Germany

[21] Appl. No.: 298,568

[22] Filed: Aug. 31, 1994

[30] Foreign Application Priority Data

Mar. 3, 1992 [DE] Germany .......................... 42 06 660.3

[51] Int. Cl.⁶ .................................................. G21C 9/004
[52] U.S. Cl. .............................. 376/284; 376/283; 137/72
[58] Field of Search ...................................... 376/284, 283, 376/277; 137/72, 74, 75, 70, 468; 122/504.1, 437; 251/62, 63.5, 63.6; 236/92 C, 101 R

[56] References Cited

U.S. PATENT DOCUMENTS

| | | | |
|---|---|---|---|
| 2,389,437 | 11/1945 | Kmiecik | 137/468 |
| 2,637,333 | 5/1953 | Houston et al. | 137/72 |
| 3,842,853 | 10/1974 | Kelly et al. | 137/72 |
| 4,238,290 | 12/1980 | Schabert et al. | 376/277 |
| 4,280,871 | 7/1981 | Hoffmann | 376/283 |
| 4,490,836 | 12/1984 | Grotloh | 376/277 |
| 4,777,013 | 10/1988 | Wolters et al. | 376/283 |
| 4,836,443 | 6/1989 | Wolters et al. | 376/283 |
| 5,028,383 | 7/1991 | Moore | 376/277 |

FOREIGN PATENT DOCUMENTS

| | | |
|---|---|---|
| 528227 | 2/1957 | Belgium . |
| 0247518 | 12/1987 | European Pat. Off. . |
| 0338853 | 10/1989 | European Pat. Off. . |
| 832979 | 7/1949 | Germany . |
| 1789050 | 1/1972 | Germany . |
| 7827717 | 3/1979 | Germany . |
| 2906341 | 9/1979 | Germany . |
| 3339627 | 5/1985 | Germany . |
| 3526377 | 2/1987 | Germany . |
| 3617524 | 2/1988 | Germany . |
| 3812552 | 11/1989 | Germany . |
| 4041418 | 6/1992 | Germany . |
| 454560 | 6/1968 | Switzerland . |
| 972474 | 10/1964 | United Kingdom . |
| 2094441 | 9/1982 | United Kingdom . |

OTHER PUBLICATIONS

Nuclear Engineering International, (OLIVON) May 1984 pp. 40–43 "Improving French PWR overpressure protection with Sebim valves".

Primary Examiner—Daniel D. Wasil
Attorney, Agent, or Firm—Herbert L. Lerner; Laurence A. Greenberg

[57] ABSTRACT

A nuclear reactor has a pressure vessel with an interior, a coolant conducting surface, such as a wall of the pressure vessel or a line passing through the wall of the pressure vessel, a pressure relief line, and a core. A safety device which protects the pressure vessel against overpressure failure upon inadequate cooling of the core includes a pressure relief valve being pressure-tightly inserted into the coolant conducting surface and having a seat, a closure element normally disposed on the seat for blocking a flow from the interior of the pressure vessel to the pressure relief line, an abutment, and a valve closing spring holding the closure element and being supported against the abutment. A force transmission element holds the abutment and has an end facing away from the abutment. A detent is disposed in the pressure vessel and fixes the end of the force transmission element. The detent is releasable in dependence on a given threshold temperature, for example 700° C., for freeing the abutment and lifting the closure element off the seat as a result of a pressure differential.

19 Claims, 3 Drawing Sheets

SAFETY DEVICE PROTECTING A NUCLEAR REACTOR PRESSURE VESSEL AGAINST OVERPRESSURE FAILURE

CROSS-REFERENCE TO RELATED APPLICATION

This application is a continuation of International Application Serial No. PCT/DE93/00183 filed Mar. 2, 1993.

BACKGROUND OF THE INVENTION

1. Field of the Invention

The invention relates to a safety device protecting a nuclear reactor pressure vessel against overpressure failure in the event of inadequate cooling of the core, including a pressure relief valve being pressure-tightly inserted into a wall of the pressure vessel or into a line passing through the wall, the pressure relief valve having a closure element normally blocking a flow from the interior of the pressure vessel to a pressure relief line and being held by a valve closing spring supported against an abutment.

In a device for temperature-dependent pressure relief of pressure vessels, which is known from German Patent DE 36 17 524 C2, corresponding to Published European Application No. 0 247 518 A2 and U.S. Pat. No. 4,836,443, a shut-off device provided in a pressure vessel blow-off line is opened at a preset temperature. The effect achieved through this temperature-dependent pressure relief is that in the event of an extremely unlikely failure of all of the cooling devices of a nuclear power station, the pressure in the primary circuit is reduced to a low level before the wall of the reactor pressure vessel can be damaged by an excessive temperature. In the known device according to the applications and patent mentioned above, the temperature sensor is disposed outside the reactor pressure vessel. The known device therefore works with a relatively high time constant, as calculated from the beginning of the impermissibly high temperature to the commencement of the pressure relief response.

German Published, Non-Prosecuted Application DE 35 26 377 A1, corresponding to U.S. Pat. No. 4,777,013, describes a high-temperature reactor having a reactor pressure vessel and a safety valve in the form of a spring valve for limiting the pressure in the reactor pressure vessel in the event of core heating incidents. The reactor pressure vessel is lined internally with a liner connected to a liner cooling system. The valve spring of the safety valve is formed of a material having a spring force which decreases with rising temperature. When the safety valve is open the valve spring is acted on by a flow of outgoing gas and for cooling purposes it is connected to the liner cooling system.

SUMMARY OF THE INVENTION

It is accordingly an object of the invention to provide a safety device protecting a nuclear reactor pressure vessel against overpressure failure, which overcomes the hereinafore-mentioned disadvantages of the heretofore-known devices of this general type and with which the pressure relief in a nuclear reactor pressure vessel upon the occurrence of an excessive temperature in its interior, resulting from the failure of the core cooling (that is per se very highly unlikely), is effected with a lower time constant.

With the foregoing and other objects in view there is provided, in accordance with the invention, in a nuclear reactor having a pressure vessel with an interior, a coolant conducting surface, such as a wall of the pressure vessel or a line passing through the wall of the pressure vessel, a pressure relief line, and a core, a safety device protecting the pressure vessel against overpressure failure upon inadequate cooling of the core, comprising a pressure relief valve being pressure-tightly inserted into the coolant conducting surface and having a seat, a closure element normally disposed on the seat for blocking a flow from the interior of the pressure vessel to the pressure relief line, an abutment, and a valve closing spring holding the closure element and being supported against the abutment; a force transmission element holding the abutment and having an end facing away from the abutment; and a detent being disposed in the pressure vessel and fixing the end of the force transmission element, the detent being releasable in dependence on a given threshold temperature, for example approximately 700° C., for freeing the abutment and lifting the closure element off the seat as a result of a pressure differential.

In accordance with another feature of the invention, the force transmission element extends from its force application point on the abutment into the interior of the pressure vessel as far as a built-in element or installed component, where it is fastened by means of the temperature-dependent detent.

In the case of the force transmission element, use may be made of elements transmitting compressive or tensile force. The detent releasable in dependence on a threshold temperature may be in the form of a fusible solder detent or of a so-called 1-member (for example a metal bar having a raised linear temperature coefficient).

In accordance with a further feature of the invention, the force transmission element is in the form of a tension element, which is coupled at its end to the closure element by means of the abutment of the valve closing spring, and at its other end is fastened by means of the temperature-dependent detent, which permits axial movement of the tension element when the threshold temperature is reached.

In accordance with an added feature of the invention, the tension element is fastened by means of a fusible solder detent which melts when the threshold temperature is reached. In order to provide a fusible solder detent of this kind, silver solder alloys, which are stable and also resistant to radiation up to their melting point of, for example, approximately 700° C., have been found to be advantageous.

In accordance with an additional feature of the invention, the tension element is joined tensionally fast at its other end (projecting into the pressure vessel) to a metal bar being fastened to and in thermal contact with built-in elements or internal components of the pressure vessel, and is secured by means of this metal bar, and the coefficient of linear expansion of the metal bar is higher, preferably substantially higher, than that of the tension element, while the metal bar and with it the tension element undergo an elongation when the threshold temperature is reached, in such a way that the closure element opens.

In accordance with yet another feature of the invention, the tension element is a draw rod which is connected to the temperature-dependent detent at its free end (in the interior of the pressure vessel).

In accordance with yet a further feature of the invention, for purposes of installation, dismantling and re-installation, the force transmission element is provided, inside the pressure vessel, with a releasable coupling permitting the uncoupling and withdrawal of at least a part of the force transmission element before the dismantling of the pressure vessel lid.

In accordance with yet an added feature of the invention, the force transmission element, together with its temperature-dependent detent, is capable of being fastened to an upper grid plate of the pressure vessel and, by means of a releasable coupling or locking means, for example a bayonet fastening, of being released and dismantled from above, at least as regards an outer or upper part, when the pressure relief valve is open.

In accordance with yet an additional feature of the invention, the pressure relief valve is flanged on a connection neck on the lid of the pressure vessel. When the pressure vessel has to be first depressurized and then opened on the occasion of a fuel assembly change, the lid insulation is first lifted off and the control rods and the measuring lances are extracted, and during these preparatory steps the pressure relief valve is also unflanged from its connection neck on the lid and (after releasing its bayonet fastening) the tension element is pulled out. The lid bolts can then be released with the aid of a bolt wrench and the lid can then be lifted off.

In accordance with again another feature of the invention, the closure element of the pressure relief valve is a valve cone which tapers towards the flow arrival direction and which is held sealingly by the force transmission element against correspondingly conical seat surfaces and against the action of the force resulting from the pressure differential. This construction is particularly advantageous from the point of view of flow.

In accordance with again a further feature of the invention, the valve stem of the closure element is sealingly and slidingly guided in a stuffing box, an overflow chamber communicating with the pressure relief line and delimiting the valve seat is situated on that side of the stuffing box which faces the pressure vessel, and the valve spring is housed in a valve chamber on the other side of the stuffing box. This valve chamber is pressure-tightly closed against the outside. It is situated at the point of the force transmission element farthest from the temperature-dependent detent, so that this valve chamber and the valve closing spring contained therein are at a relatively low temperature level, particularly as the casing of the pressure relief valve is bathed externally by the flow of cooling air of the reactor pressure vessel.

In accordance with again an added feature of the invention, the force transmission element extends, sliding centrally, through the valve stem, which projects into the valve chamber, the valve stem widens on the side of the stuffing box facing away from the closure element into a pressure-tight capsule delimiting the valve chamber, or is joined to such a capsule, and the valve closing spring is contained in the capsule and is supported at one end on the bottom of the capsule, while at the other end it is supported against the abutment formed or carried by the free end of the force transmission element. Since the valve stem is formed of a longitudinally movable component, it forms a movement seal in conjunction with the stuffing box through which it passes.

In accordance with again an additional feature of the invention, the pressure-tight capsule is in addition pressure-tightly enclosed relative to the outside by means of a casing lid. In this way any small leakage flows that occur, and which would find their way through the stuffing box along the movement seal, cannot reach the outside under any circumstances. The occurrence of such leakage flows would of course mean that the closure element itself does not have 100% tightness.

In accordance with another feature of the invention, given correspondingly smaller cross-sectional dimensions of the pressure relief valve and of the connection neck on the lid, it is also within the scope of the invention for the pressure relief line to be in the form of a control line for a separate blow-off valve. In this case relatively small diameters of the connection necks, such as are customary, for example, for measuring lance lead-ins, are adequate.

In accordance with a concomitant feature of the invention, the releasable coupling is a screw thread coupling.

Other features which are considered as characteristic for the invention are set forth in the appended claims.

Although the invention is illustrated and described herein as embodied in a safety device protecting a nuclear reactor pressure vessel against overpressure failure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE INVENTION

FIG. 1 is a fragmentary, diagrammatic, cross-sectional view of a safety device according to the invention, including a pressure relief valve, a tension element and a fusible solder detent fixing the tension element on a grid plate of the reactor pressure vessel;

FIG. 2 is a fragmentary, cross-sectional view of a variant of the exemplary embodiment according to FIG. 1, including a metal bar which is bolted thermoelastically on the grid plate and which is joined to the tension element and has a higher coefficient of linear thermal expansion than the element; and FIG. 3 is a fragmentary, cross-sectional view of a variant of the exemplary embodiment according to FIG. 1, wherein the tension element can be disconnected, inside the pressure vessel and above a guide framework, by means of a screw thread coupling.

DESCRIPTION OF THE PREFERRED EMBODIMENTS

Figure 1:
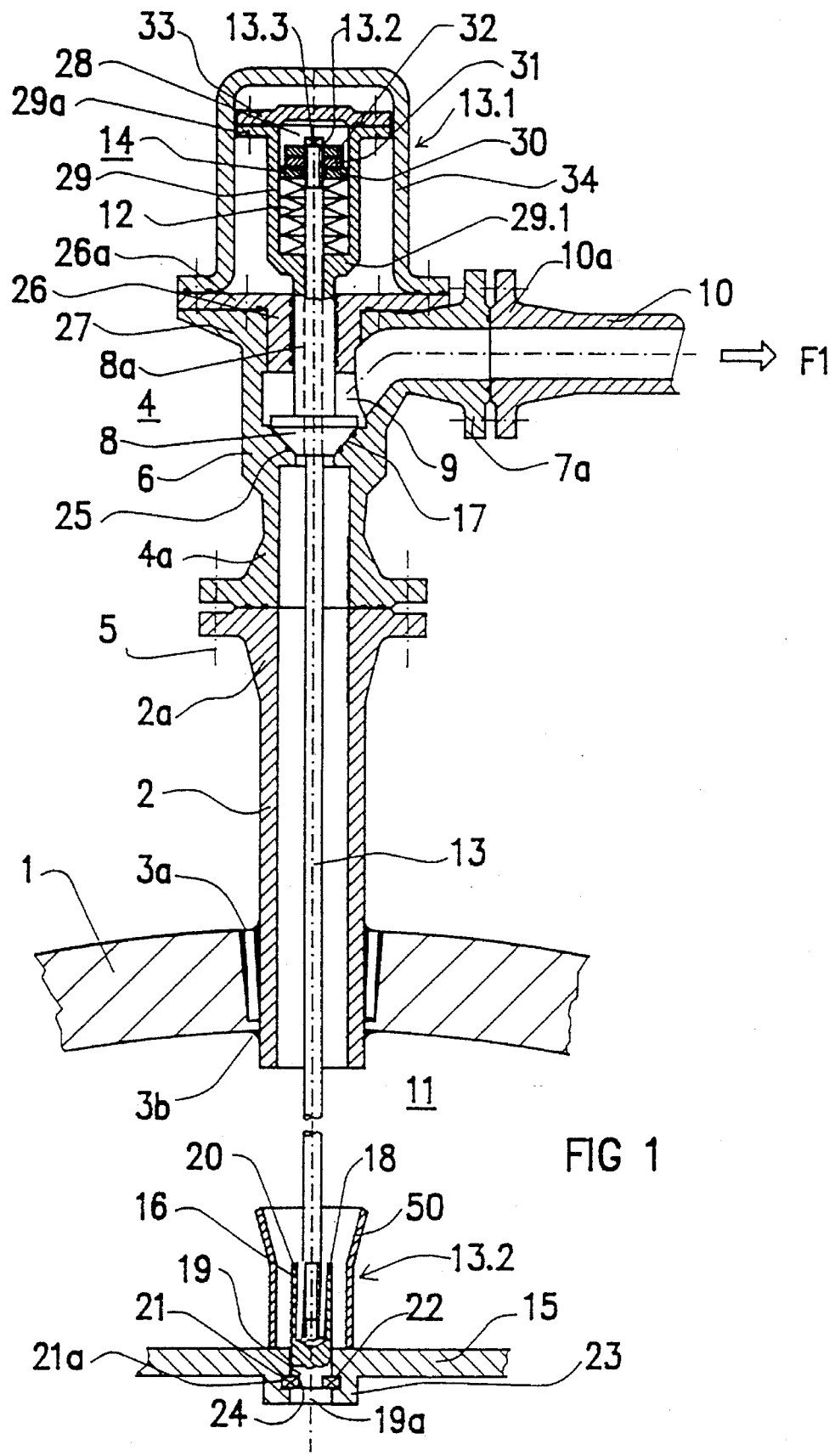

Referring now to the figures of the drawing in detail and first, particularly, to FIG. 1 thereof, there is seen a connection neck 2 on a partially illustrated lid 1 of a nuclear reactor pressure vessel 11 (referred to below as the "pressure vessel"), wherein the connection neck is pressure-tightly welded into the lid, and outer and inner circumferential weld seams are designated by reference symbols 3a and 3b. The connection neck 2 on the lid has an outer end with a welded-on flange part 2a, to which a coating flange part 4a of a pressure relief valve 4 is pressure-tightly bolted (as is seen by flange bolts indicated at reference numeral 5). The pressure relief valve 4 has an inlet connection neck 6 to which the flange part 4a belongs, an outlet connection neck 7 provided with a flange ring 7a, and an overflow chamber 9 which interconnects the inlet and outlet connection necks 6, 7 when a closure element 8, in the form of a valve sealing cone, is open. In a closed position of the closure element 8, which is shown in the figure, the overflow chamber 9 is only in communication with the outlet connection neck 7 with respect to flow. A blow-off line 10 which is only partly shown has a corresponding annular coating flange 10a and is pressure-tightly bolted to the annular flange 7a. An arrow F1 symbolizes the direction of the flow of steam from the interior of the pressure vessel 11, when the closure element 8 has opened upon the attainment of a threshold temperature in the interior of the pressure vessel 11.

The illustrated safety device accordingly prevents overpressure failure of the pressure vessel 11 in the event of inadequate core cooling. For this purpose, the pressure relief valve 4 is pressure-tightly inserted into a wall of the lid 1, which is a lid dome of the pressure vessel 11 in the illustrated example. With the aid of the closure element 8 that is loaded in the closing direction by a valve closing spring 12 which is supported against an abutment 14, the pressure relief valve 4 normally blocks the flow from the interior of the pressure vessel 11 to the pressure relief or blow-off line 10. A force transmission element in the form of an elongated tension element 13, which is preferably a draw rod, has one end 13.1 being coupled by means of the abutment 14 of the valve spring 12 to the closure element 8 or its valve stem 8a, while another end 13.2 thereof projects into the interior of the pressure vessel 11. In the pressure vessel 11, the other end 13.2 is fixed to built-in elements or installed components 15 of the pressure vessel 11 by means of a temperature-dependent detent 16, which permits an axial movement of the tension element 13 upon reaching a threshold temperature of 700° C., for example, so that the valve spring 12 is relieved of load and the closure element 8 is freed to lift off a valve seat 17 as the result of a pressure differential. The built-in elements or installed components 15 take the form of an upper core grid plate of a nuclear reactor pressure vessel of the pressurized water type. Overheating of the core would be transmitted directly to this core grid plate 15, so that the core grid plate is particularly well suited for the mounting of the temperature-dependent detent 16. The detent 16 according to FIG. 1 is a—fusible solder detent. In this configuration the bottom end 13.2 of the tension element 13 is soldered by means of silver solder 20 into a cavity 18 of a locking head 19.

The locking head 19 has a hammer head 19a engaging in grooves 21a behind a fitting part 21, which may be annular in shape. The fitting part 21 is inserted into an annular groove 22 in an inner periphery of a downwardly projecting fitting part holder 23, which is joined to or integral with the grid plate 15. When the hammer head 19a is to be taken out of this bayonet fastening, the valve closing spring 12 is compressed slightly further until the hammer head 19a comes out of engagement with the grooves 21a and can be turned 90°. If the valve closing spring 12 is then slowly relieved of load, the hammer head 19a can be pushed or threaded through a rectangular cutout 24 (which has a profile permitting the passage of the hammer head). The process of locking the hammer head 19a proceeds in the appropriate order which is the reverse of the unlocking operation. An insertion tube 50, which is disposed coaxially to the axis of the tension element 13 or of the rectangular cutout 24 and which has a conical extension 50.1, serves to assist the insertion of the locking head 19 in this process. The tube is fastened to an upper surface of the grid plate 15, for example by welding.

The cavity 18 in the locking head 19 is so deep, or overlaps the tension element 13 over such a length, that the silver solder joint between the end 13.2 of the tension element 13 and the locking head 19 resists the shearing force load transmitted by the tension element 13 under all circumstances, in the normal operation of the nuclear reactor. If the threshold temperature of, for example, approximately 700° C. is reached in the region of the fusible solder detent 20 as the result of overheating of the non-illustrated reactor core, which also affects the built-in elements or installed components of the latter, including the upper core grid plate 15 as well, the detent melts and can no longer resist the shearing forces acting on it. As a consequence, the tension element 13 is freed, and the valve closing spring 12 is relieved of load to such an extent that the closure element 8 is lifted off its valve seat 17 because of the differential pressure forces acting on it. A blow-off flow through the pressure relief valve 4, which is driven by the pressure in the interior of the reactor, comes into play through the blow-off line 10 to a non-illustrated blow-off tank, as is seen by the flow arrow F1. In the released state the valve closing spring 12 is acted on only by the weight load of the tension element 13, so that pressure can be released down to a pressure level lower than 30 bar, and in particular practically to the pressureless state.

The shape shown in the drawing for the closure element 8 is particularly favorable for the blow-off operation described. The element is a valve cone which tapers towards the flow arrival direction and which is held sealingly by the tension element 13 against correspondingly conical seat surfaces 17 and against the action of the force resulting from the pressure differential. In order to improve the sealing action, sealing rings 25, which are preferably made of a corrosion-resistant steel alloy, can furthermore be let into the valve seat surfaces 17.

According to the preferred illustrated embodiment, the valve stem 8a of the closure element 8 is guided sealingly and slidingly in a stuffing box 26. The stuffing box 26 forms a first lid for a valve casing 27 adjoining the inlet connection neck 6 and has an annular flange 26a by means of which it is sealingly clamped against a fitting surface on an end surface of the valve casing 27. The previously mentioned overflow chamber 9 is situated on the side of the stuffing box 26 facing the pressure vessel 11, it communicates with the pressure relief line in the form of the blow-off line 10 and it forms the valve seat 17. On the other side of the stuffing box 26 the valve closing spring 12, which is preferably in the form of a helical compression spring or a stack of disk springs as shown, is housed in a valve chamber 28. In order to prevent temperature-dependent variations of the length of the tension or force transmission element 13 from leading to constraining forces caused by the prevention of thermal expansion, the tension element 13 extends and slides centrally through the valve stem 8a, which projects into the valve chamber 28. As is illustrated, the valve stem 8a is widened on the side of the stuffing box 26 facing away from the closure element 8 into a pressure-tight capsule 29 delimiting the valve chamber 28, or the valve stem 8a is joined to such a capsule 29. The valve closing spring 12, which is situated in the capsule 29, is supported at one end on a bottom 29.1 of the capsule 29, while at the other end it is supported against the abutment 14 which is formed or carried by the free end of the tension element 13. More specifically, for this purpose the free end 13.1 of the tension element 13 carries an annular disk 30, while adjacent thereto a nut and a locknut 31, 32 are screwed onto a threaded stem 13.4 of the tension element 13. A square 13.3 at the top end of the tension element 13 serves for the application of a tool for turning purposes (to prevent rotation when the flat-edged nuts 31, 32 are tightened or to bring the hammer head 19a at the bottom end of the tension element 13 into or out of engagement with the bayonet fastening).

The pressure-tight capsule 29 is pressure-tightly closed relative to the outside by means of a flange lid 33 (second valve lid), which is clamped to an annular flange 29a of the capsule 29. The pressure relief valve 4 is pressure-tightly closed against the outside by another valve lid 34 (third valve lid), which serves above all for the pressure-tight enclosure of the movement seal between the valve stem 8a and the stuffing box 26 relative to the outside, but which is also an additional sealing barrier for the flange connections of the first valve lid (stuffing box 26) and the second valve lid (flange lid 33). Through the use of this configuration it is ensured that, with its flange connections, the pressure relief valve has at least equally good sealing as the non-illustrated lid flange of the appertaining reactor pressure vessel 11.

The pressure relief valve shown in FIG. 1 can be used as a control valve for a separate blow-off valve, given correspondingly smaller cross-sectional dimensions and given a correspondingly smaller nominal width of the connection neck 2 on the lid and of the blow-off line 10. The blow-off or pressure relief line 10 is then associated with the control pressure line and the non-illustrated triggered blow-off valve is associated with a likewise non-illustrated blow-off tank. The advantage of such a configuration, in comparison with the pressure relief valves heretofore already known in connection with pressurizers, is that the pressure control valve reacts very quickly to threshold temperatures in the interior of the reactor.

Figure 2:
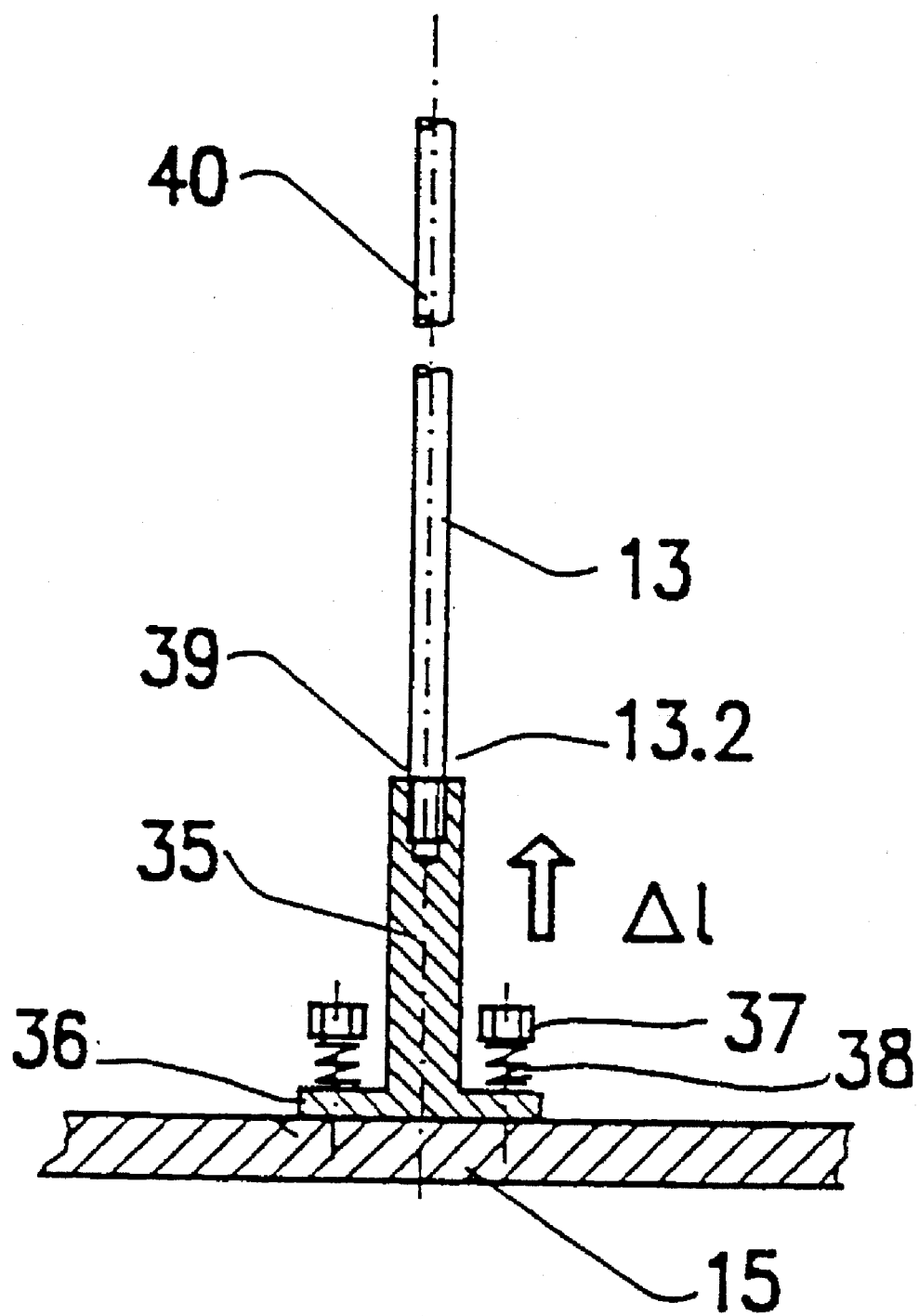

The second exemplary embodiment according to FIG. 2 differs from the first exemplary embodiment essentially in that the tension element 13 is fixedly connected tensionally, for example by being bolted (as illustrated) or welded, at its other (or bottom) end 13.2 to a metal bar 35, and is secured by means of this metal bar 35 to built-in elements or installed components of the pressure vessel 11. In order to ensure that the removable top end of the rod is not too long, the screw thread coupling 39 may also be moved further up, for example to a disconnection point 40. The illustrated screw thread coupling 39 would then be replaced by a fixed connection. The coefficient of linear expansion of this metal bar 35 is selected to be higher, and preferably substantially higher, than that of the tension element 13, so that when the threshold temperature is reached the metal bar 35, and with it the tension element 13, undergo an elongation 1 in such a way that the closure element 8 shown in FIG. 1 opens. The bottom end of the metal bar 35 can be fixed to the built-in elements or installed components 15 (upper core grid plate) by means of a bayonet fastening as in the first exemplary embodiment according to FIG. 1, instead of by a screw thread coupling 39. For example, it is also possible to provide the metal bar 35 with an annular foot 36 at its bottom end as is illustrated, and to fasten the foot 36 thermoelastically to the built-in elements or installed components 15 by means of bolts 37 that are secured against vibration. The thermoelastic fastening can, for example, be effected with the aid of spring washers 38 between the heads of the bolts 37 and the foot 36. From the point of view of ease of installation, dismantling and re-installation, a bayonet-type fastening for fixing the metal bar 35 is more advantageous, although not indispensable.

The tension element 13 can generally be a force transmission element which is loadable by either tension or compression or which can tolerate both types of loading. In order to obtain the closing force, the compression spring 12 (particularly a stack of disk springs) is provided in the exemplary embodiment. However, the closing force could also be applied correspondingly by a valve closing spring under tensile loading. It is essential to the invention that the closure element 8 is held in its closed position, as illustrated, by means of a detent which is releasable in dependence on a threshold temperature and by which the valve closing forces acting on the closure element 8 are reduced to such an extent that the closure element 8 can be shifted to its open position because of the differential pressure forces acting on it, when the threshold temperature is reached. In this configuration the heat flow bringing about the release of the detent can, for example, also be transmitted through heat-conducting components from the pressure vessel lid to the temperature-sensitive detent, since upon the overheating of the reactor, the lid also supplies a good image of the overheating, particularly on its inner periphery, above all as the result of heat radiation. If (as is illustrated in FIGS. 1 and 2) the temperature-sensitive detent is associated with built-in elements or installed components of the pressure vessel which are disposed closer to the reactor core than the lid, somewhat quicker release or opening of the pressure relief valve can be achieved thereby.

Figure 3:
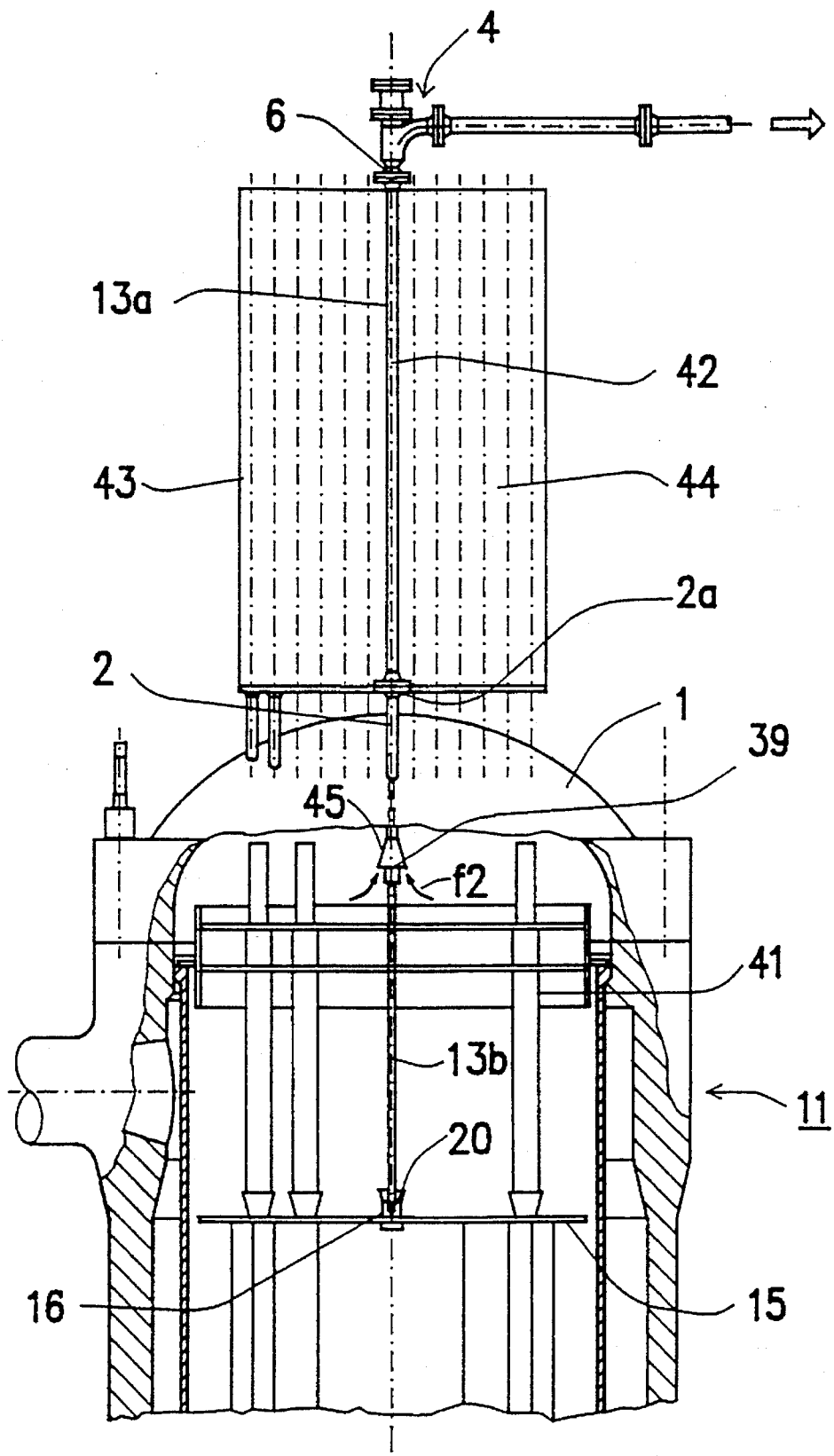

FIG. 3 shows a general view of a safety device according to the invention, in which instead of a bayonet fastening in the region of the grid plate 15 (see FIG. 1) a screw thread coupling 39 is provided above a core framework 41, but below the pressure vessel lid 1, that is to say inside the interior space of the pressure vessel 11 which is surrounded by the arched lid 1. The inlet connection neck 6 of the pressure relief valve 4 is flanged on the connection neck 2 by means of a long intermediate pipe 42. The intermediate pipe 42 has a slightly greater axial length than a control rod holding framework 43, or passes through the latter axially parallel to axes 44 of non-illustrated control rods. The connection neck 2 on the lid leads out downwardly into a conically widened inlet tube 45 for a primary medium. The tube is disposed in the region of the screw thread coupling 39. Flow arrows f2 indicate the flow as the result of an excessive temperature, when the temperature-dependent detent 16 has been released and the pressure relief valve 4 has opened. The example according to FIG. 3 shows that a bottom half 13b of the tension element 13 is a component part of the core framework 41 and can be lifted out together with the latter. After the screw thread coupling 39 has been released (with the pressure vessel 11 depressurized, with the pressure relief valve 4 open and after disconnection of the flange connections concerned), a top part 13a of the tension element 13 can be removed separately or together with the control rod holding framework 43 before the lid 1 is opened.

We claim:

1. In a nuclear reactor having a pressure vessel with an interior, a coolant conducting surface, a pressure relief line, and a core, a safety device protecting the pressure vessel against overpressure failure upon inadequate cooling of the core, comprising:

a pressure relief valve being pressure-tightly inserted into the coolant conducting surface and having a seat, a closure element normally disposed on said seat for blocking a flow from the interior of the pressure vessel to the pressure relief line, an abutment, and a valve closing spring holding said closure element and being supported against said abutment;

a force transmission element holding said abutment and having an end facing away from said abutment; and a detent being disposed in the pressure vessel and fixing said end of said force transmission element, said detent being releasable in dependence on a given threshold temperature for freeing said abutment and lifting said closure element off said seat as a result of a pressure differential.

2. The safety device according to claim 1, wherein said given threshold temperature is approximately 700° C.

3. The safety device according to claim 1, wherein the coolant conducting surface is a wall of the pressure vessel.

4. The safety device according to claim 1, wherein the coolant conducting surface is a line passing through a wall of the pressure vessel.

5. The safety device according to claim 1, including components installed in the pressure vessel, said force transmission element extending from a force application point on said abutment into the interior of the pressure vessel as far as said installed components where said force transmission element is fixed by said temperature-dependent detent.

6. The safety device according to claim 1, wherein said force transmission element is a tension element having one end coupled to said closure element by said abutment for said valve closing spring and another end being fixed by said temperature-dependent detent, said temperature-dependent detent permitting axial movement of said tension element when said given threshold temperature is reached.

7. The safety device according to claim 1, wherein said temperature-dependent detent is a fusible solder detent fixing said force transmission element and melting when said given threshold temperature is reached.

8. The safety device according to claim 6, including components installed in the pressure vessel, a metal bar being fastened to and in thermal contact with the installed components and having a coefficient of linear expansion being higher than that of said tension element, said end of said tension element being tensionally fixedly joined to said metal bar and secured by said metal bar, and said metal bar and said tension element together undergoing an elongation opening said closure element when said given threshold temperature is reached.

9. The safety device according to claim 1, wherein the pressure vessel has a lid and a connection neck on the lid, and said pressure relief valve is flanged on said connection neck.

10. The safety device according to claim 6, wherein said tension element is a draw rod.

11. The safety device according to claim 1, wherein the pressure vessel has a lid, and said force transmission element has a releasable coupling inside the pressure vessel permitting uncoupling and withdrawal of at least a part of said force transmission element before dismantling the lid.

12. The safety device according to claim 11, including releasable coupling or locking means, the pressure vessel having an upper grid plate, and said force transmission element together with said temperature-dependent detent being able to be fastened to the upper grid plate and being released and dismantled from above by said releasable coupling or locking means, at least with regard to an outer or upper part, when said pressure relief valve is open.

13. The safety device according to claim 12, wherein said releasable coupling or locking means are a bayonet fastening.

14. The safety device according to claim 1, wherein said seat has conical seat surfaces, and said closure element of said pressure relief valve is a valve cone tapering towards a flow arrival direction and being held sealingly by said force transmission element against said correspondingly conical seat surfaces and against action of a force resulting from the pressure differential.

15. The safety device according to claim 1, including a stuffing box having a side facing the pressure vessel and another side, said closure element having a valve stem being sealingly and slidingly guided in said stuffing box, an overflow chamber communicating with the pressure relief line, delimiting said valve seat and being disposed on said side of said stuffing box facing the pressure vessel, and a valve chamber housing said valve closing spring on said other side of said stuffing box.

16. The safety device according to claim 15, including a pressure-tight capsule delimiting said valve chamber and having a bottom, said force transmission element having a free end and extending slidingly and centrally through said valve stem projecting into said valve chamber, said valve stem widening into or being joined to said capsule on said other side of said stuffing box facing away from said closure element, said valve closing spring being contained in said capsule and having one end being supported on said bottom of said capsule and another end being supported against said abutment, and said abutment being formed or carried by said free end of said force transmission element.

17. The safety device according to claim 1, wherein the pressure vessel has a lid and a connection neck on the lid, said pressure relief valve and the connection neck have correspondingly smaller cross-sectional dimensions, and the pressure relief line is a control line for a separate blow-off valve.

18. The safety device according to claim 11, wherein said releasable coupling is a screw thread coupling.

19. The safety device according to claim 12, wherein said releasable coupling is a screw thread coupling.

* * * * *